R. V. WILLIAMS.
WAGON BRAKE.
APPLICATION FILED MAR. 30, 1914.
1,124,371.
Patented Jan. 12, 1915.
2 SHEETS—SHEET 1.
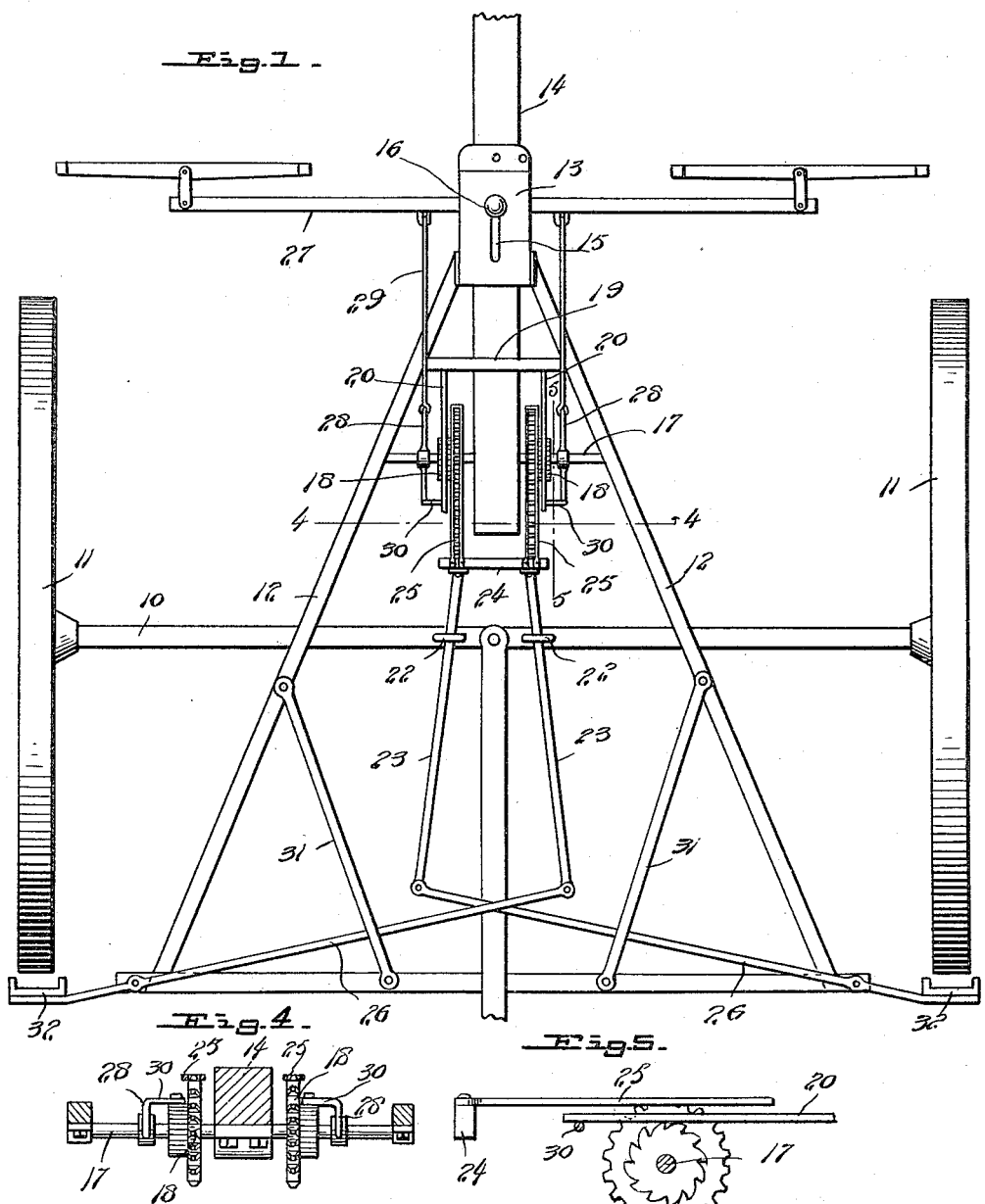
Witnesses
Chas. E. Kimpler,
Harry M. Test.
Inventor
R. V. Williams.
By
Attorneys.

R. V. WILLIAMS.
WAGON BRAKE.
APPLICATION FILED MAR. 30, 1914.
1,124,371.
Patented Jan. 12, 1915.
2 SHEETS—SHEET 2.
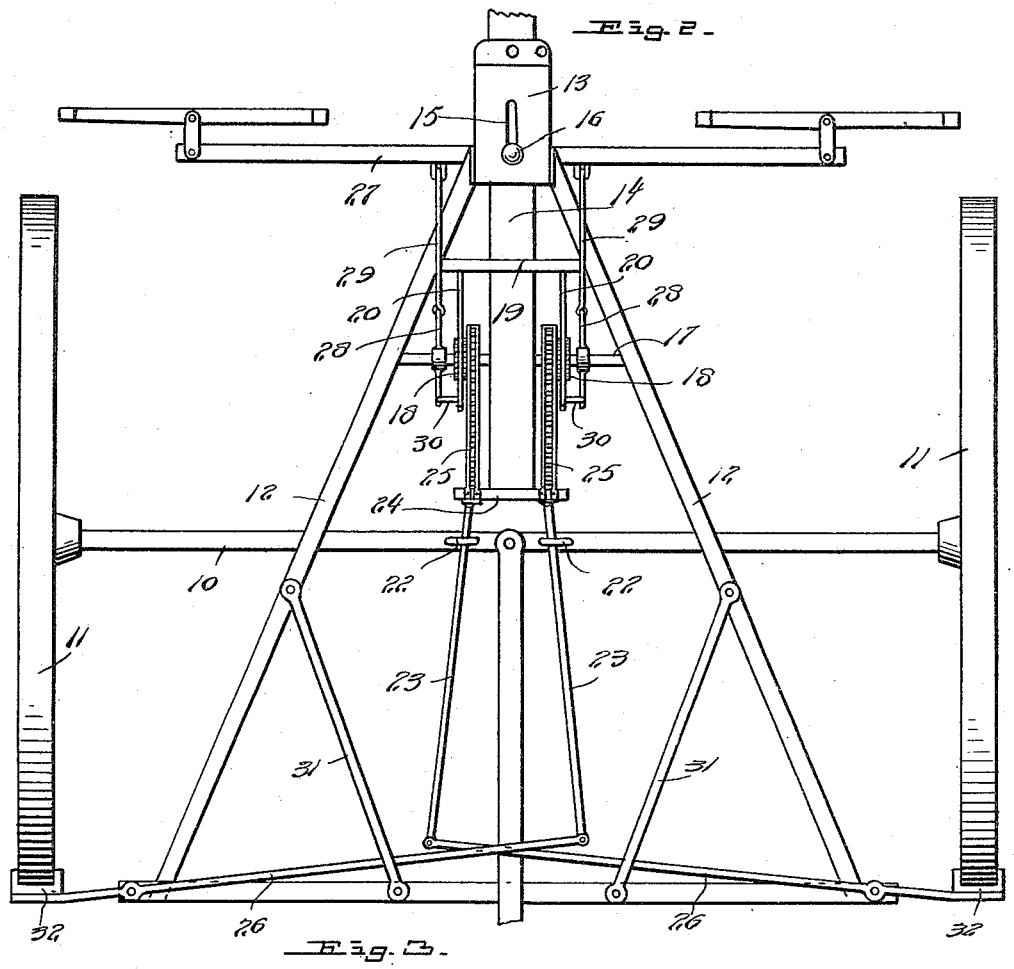
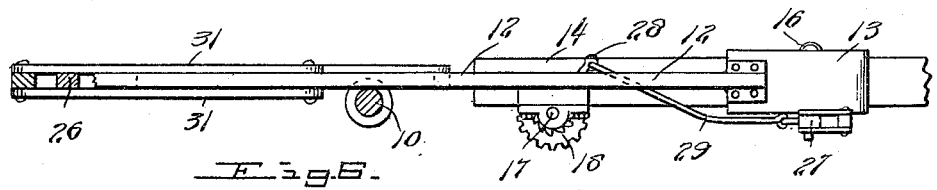
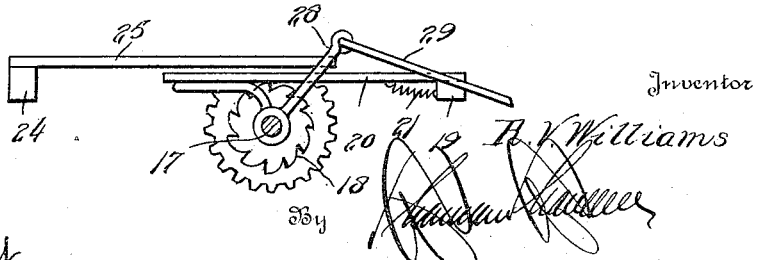

UNITED STATES PATENT OFFICE.

ROGER V. WILLIAMS, OF KILLEN, ALABAMA.

WAGON-BRAKE.

1,124,371.

Specification of Letters Patent.

Patented Jan. 12, 1915.

Application filed March 30, 1914. Serial No. 828,253.

*To all whom it may concern:*

Be it known that I, ROGER V. WILLIAMS, a citizen of the United States, residing at Killen, in the county of Lauderdale, State of Alabama, have invented certain new and useful Improvements in Wagon-Brakes; and I do hereby declare the following to be a full, clear, and exact description of the invention, such as will enable others skilled in the art to which it appertains to make and use the same.

This invention relates to improvements in wagon brakes, and particularly to automatic wagon brakes.

One object of the invention is to provide an improved construction of device of this character in which the brakes are applied when the draft animals back.

Another object is to provide an automatic wagon brake operated by the backing of the horses which will remain in locked position until forward pull is exerted on the draft pole or tongue.

Other objects and advantages will be apparent from the following description, when taken in connection with the accompanying drawings.

In the drawings: Figure 1 is a plan view of a portion of the running gear of a wagon showing my invention applied thereto and in released position. Fig. 2 is a similar view showing the parts when in operative position. Fig. 3 is a side elevation of the device in the position of Fig. 1. Fig. 4 is a transverse section on the line 4—4 of Fig. 1. Fig. 5 is a longitudinal sectional view on the line 5—5 of Fig. 1. Fig. 6 is an enlarged side elevation of the locking mechanism in locked position.

Referring particularly to the accompanying drawings, 10 represents the front axle of a vehicle and 11 the wheels mounted thereon. Secured to the axle are the hounds 12, and carried by the forward converging ends of the hounds is a casing 13, through which is slidably disposed the draft pole or tongue 14. In the upper and lower walls of the casing are formed the slots 15 through which extends a vertical bolt 16 disposed through the tongue 14. Extending transversely between the forward portions of the hounds is a shaft 17, and mounted on this shaft are the combined ratchet and sprocket wheels 18. Secured to the hounds forwardly of the shaft 17 is a bar 19 on which are pivotally mounted the rearwardly extending pawl carrying arms 20, these arms engaging the ratchet portions of the wheels 18 and held in such position by the springs 21. Carried by the axle are the guide members 22 through which are slidably disposed the rearwardly extending brake operating bars 23. Connecting the forward ends of these bars is a cross member 24, and secured adjacent each end of the member 24 is a rack bar 25. Each of these rack bars is in the semblance of a ladder, the cross or rung portions of which engage between the teeth of the pinion portion of the wheel 18. Pivotally connected adjacent their outer ends to the rear ends of the hounds are the brake levers 26, the opposite end of each of the levers being pivotally connected to the rear end of one of the bars 23.

Pivotally secured to the tongue 14 by means of the beforementioned bolt 16 is a doubletree bar 27. Mounted to swing on the shaft 17 adjacent the ratchet portions of the wheels 18 are the vertical levers 28, the lower ends of which are connected with the doubletree bar by means of the rods 29. The upper ends of these levers are directed inwardly toward the wheels 18 as indicated at 30, and these inturned portions are disposed under the free end of the pivoted pawl members 20.

Mounted on the rear portion of the hounds, back of the axle are the parallel superposed strips 31 which serve as braces for the hounds and also receive therebetween the brake levers 26 to guide and support the said levers. The outer ends of the brake levers are provided with the usual brake shoes 32 for engagement with the wheels 11.

In the normal position of the parts, when the draft animals are pulling the vehicles, the tongue 14 is in its forward limited movement, so that the bolt 16 engages against the front end walls of the slots 15. When the animals back the tongue 14 is pushed backwardly through the casing 13, the rear end of the tongue engaging the cross member 24 and pushing the same rearwardly, said movement causing the bars 23 to rock the levers 26 on their pivots and force the shoes 32 against the wheels. When the member 24 moves rearwardly, the rack bars 25 will rotate the wheels 18, the ratchet teeth thereof moving under the pawl levers 20. This constitutes a lock which holds the brake shoes firmly against the wheels, and prevents any disengagement thereof. To release the brake shoes it is only necessary for the animals to move forward so as to pull the pole forward, this causing the rods 29 to rock the levers 28 and bring their inturned ends 30 into engagement with the free ends of the levers 20 and effect the raising of said levers out of engagement with the ratchet teeth. The levers 28 will be normally held in the position just described as long as the animals are pulling, but the instant the animals start to back, the pole together with the doubletree will move backwardly and thus release the levers and permit the pawl levers 20 to fall and again engage the ratchet teeth.

From the foregoing, it will readily be seen that I have provided a novel and effective device for applying the vehicle brake, together with means for positively preventing accidental release of the brake.

What is claimed is:

1. In an automatic wagon brake, brake levers, forwardly extending elements carried by the brake levers, a bumper member carried by the forward extending elements, a shaft, combined ratchet and pinion wheels mounted thereon, rack members carried by the bumper member and engaging with the pinion portions of the wheels, pivoted pawl members engaging the rack portions of the wheel, a slidable tongue arranged to engage the bumper member to actuate the brake levers, means carried by the said shaft for actuation to release the pawl members, and means connected with the releasing members and with the sliding tongue for actuating said releasing members.

2. In an automatic wagon brake, brake levers, a forwardly and rearwardly sliding tongue, means carried by the brake levers for engagement with the tongue in its rearward movement to actuate the levers, a ratchet locking means actuated by the brake levers for holding the brake levers in said position, and means actuated by the tongue in its forward movement for releasing the locking means.

In testimony whereof, I affix my signature, in the presence of two witnesses.

ROGER V. WILLIAMS.

Witnesses:
J. O. FARISS,
S. M. WILLIAMS.

Copies of this patent may be obtained for five cents each, by addressing the "Commissioner of Patents, Washington, D. C."